Sept. 16, 1969      W. C. ROSS      3,467,009
COMPRESSIBLE PRINTING ROLL

Filed July 6, 1965      3 Sheets-Sheet 1

3,467,009
COMPRESSIBLE PRINTING ROLL
William C. Ross, Winchester, Mass., assignor to W. R. Grace & Co., Cambridge, Mass., a corporation of Connecticut
Filed July 6, 1965, Ser. No. 469,420
Int. Cl. B41f 5/02, 1/46, 31/14
U.S. Cl. 101—216        17 Claims

ABSTRACT OF THE DISCLOSURE

The novel roll having particular utility in printing has, in sequence, a nonresilient core, a layer of sponge rubber, and at least one layer of a resilient, volume-compressible, impregnated fibrous sheet material of specified characteristics adjacent the sponge rubber layer. The impregnated fibrous sheet material can have a thin continuous surface layer (e.g. cured butadiene-acrylonitrile rubber).

---

Figure 1:
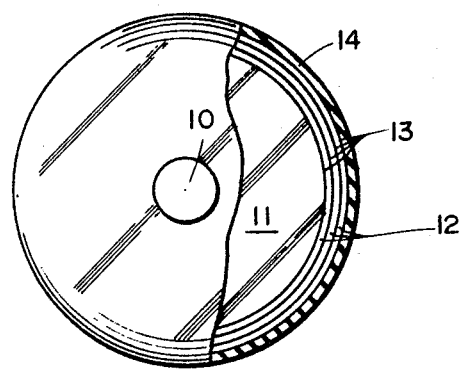

This invention relates to a novel roll and more particularly to a novel resilient, volume-compressible, nondistortable roll.

Rolls generally in use today, particularly rolls used in printing, comprise rubber or plastic rolls of varying degrees of hardness. The aforementioned rubber or plastic rolls are frequently used in conjunction with another roll, generally a nonresilient roll, e.g., a steel roll. In the employment of the roll, sufficient pressure is exerted on the rubber roll by the steel roll in order to obtain the desired contact area or land between the rolls. Rubber, however, is not a compressible material in the true sense of the word since it cannot be reduced in volume, that is, forced into a space smaller than that which it originally occupied. Rubber flows in a manner similar to liquids. However, it is elastic and possesses the ability to recover after the removal of the force which caused the initial flow. When pressures are applied to rubber, the rubber moves away from the point of application of pressure in several directions, causing distortion or deformation of the rubber without substantially changing its volume, thereby assuming a shape different from the original shapes prior to the application of the pressure. If a roll made of rubber is contacted with a second roll, the above-described property of incompressibility results in ripples or bulges at the nip and a change in the circumference of the rubber roll. This bulging of the rubber at the nip and the attendant change in roll circumference results in changes in the volocity of the surface of the roll at the nip further resulting in heat build-up, which can cause a 2 to 3% expansion of the rubber roll, generation of static electricity, and, in situations where a material such as paper is being driven through the nip, damage or possibly breakage of the material. Plastic materials which also possess the property of elasticity are subject to the same deficiencies as rubber.

The aforementioned disadvantages of rubber rolls are particularly noticeable in printing operations, for example, in gravure printing. In a gravure printing operation a paper web passes between the engraved steel gravure roll and a rubber impression roll. The pressure of the steel roll on the rubber roll is sufficient to provide the desired contact area (also referred to as impression width or land) which may be as much as ½ inch. In order to provide relatively high contact areas, a softer rubber is employed, further magnifying the degree of distortion in the rubber roll. The velocity changes which occur as a result of the distortion of the rubber roll are transmitted to the paper with the resultant distortion of the print and even frequent breaking of the paper web. The frictional forces involved result in relatively high temperatures which are detrimental to the physical properties of the rubber and hasten its deterioration and eventual failure. In the case of inking rolls the high temperatures also thin the ink to a point where the quality of the printing is impaired. In the case of letterpress printing, portions of the engraving are not reproduced as accurately as desired due to the tendencies of the soft rubber to flow around the object (deform) rather than compress under its force.

The term "elastic" as used herein is intended to indicate the property of deforming and rapidly recovering the original size and shape when the deforming forces are removed. "Stable" refers to the property of being substantially nondeformable.

A novel roll has now been found which is not subject to the above-identified deficiencies of rubber rolls. The novel roll of the present invention comprises a nonresilient core, e.g., a steel shaft or roll, and at least one layer of a volume compressible, resilient, substantially nondistortable, dimensionally stable member. Preferably two layers are employed for ease in manufacture of the roll, particularly with regard to the joining of the ends of the layer. By volume compressible is meant that the body is stabilized and there is substantially no movement under compression except in a direct line of the applied pressure. The compressible member employed in the present invention possess the property of porosity, i.e., a network of open or closed cells which permits it to be compressed within this cell structure while being restrained from elastic flow, therefore, it is volume compressible as well as dimensionally stable and there is substantially no lateral movement or creep of the compressible member. The volume compressible member is not subject to the aforementioned lateral movement, and there is no distortion of the material as is found in rubber, for example. Since the novel rolls of the present invention are generally employed in high speed operations, it is also essential that they possess a high degree of recovery. The rolls of the present invention possess the ability to recover within 2% of the original thickness substantially immediately upon the release of the applied force. In a preferred embodiment, the rolls have substantially instantaneous recovery.

The novel compressible member of the present invention is preferably a porous, fibrous web impregnated with an elastomeric material. The web may be a woven fabric or a nonwoven sheet material; preferably a nonwoven is employed. The fibers may be natural, such as cellulosic or synthetic, such as nylon, rayon, etc. Preferably, cotton linters are employed in the formation of the web.

Structurally, the above-described impregnated fibrous web is characterized by the presence of a multiplicity of very evenly distributed, interconnected, minute voids or air spaces surrounded by a tough, reinforced fiber-rubber structure. These air spaces provide areas into which the surrounding material may be displaced by the application of pressure, eliminating the necessity for massive flow of the entire body and preventing build-up of pressure as the thickness is reduced. The material which surrounds the voids, on the other hand, acts as a multitude of tiny, almost microscopic springs, which push back against the web surface.

The impregnated fibrous sheets preferably possess at least about 37% residual porosity at 4 mils compression in order to be acceptable for use in printing. Lower porosity sheets are employed where particularly high pressures are encountered. In the rolls of the present invention, relatively high degrees of porosity are desirable in the compressible material, e.g., 50% and higher, so that lower pressures may be employed to compress the roll a given amount. A greater degree of compression to give a larger contact area at a given pressure is obtained at correspondingly higher levels of porosity.

The amount of porosity still remaining in the sheet after it has been compressed a given amount, i.e., the "residual porosity," determines whether the sheet has the ability to be compressed still further when necessary in order to compensate for irregularities in paper and equipment without building up localized uneven pressures. The residual porosity at 4 mils compression has been taken as a measure of the effectiveness of the impregnated sheet material.

A particularly preferred impregnated fibrous web for use as a compressible material in the rolls of the present invention is disclosed in U.S. Patent No. 3,147,698, the disclosure of which is incorporated herein to the extent applicable. The compressible material is made by impregnating a highly porous felted fibrous web with an elastomeric material which is in a solution or water dispersion and subsequently curing the impregnated web under such conditions that compaction is avoided, and a high degree of porosity is retained. The large volume of air in the finished impregnated sheet is responsible for its compressibility. Since the sheet may be compressed in thickness without substantial increases of its lateral dimensions, it is said to be volume compressible. The porosity of the sheets at 4 mils compression is at least 37%.

The impregnated material disclosed in U.S. Patent No. 3,147,698 also possesses a certain minimum degree of firmness, or resistance to compression, so that at least a certain minimum amount of presure must be applied to the material in order to effect the amount of compression customarily used in printing. The firmness of the compressible material is expressed in terms of the pressure which must be exerted on the material in order to reduce its original thickness by 2 mils, i.e., to effect an initial compression of 2 mils. The compressible impregnated fibrous sheet material must have sufficient firmness so that at least 10 pounds per square inch must be applied to the sheet in order to effect an initial compression of 2 mils.

The amount of impregnant to be used will be determined chiefly by the porosity and resilience desired in the finished impregnated sheet and by practical considerations well-understood by those skilled in the art of impregnating fibrous webs. With materials currently available, the necessary resilience may be achieved if the elastomeric impregnant, i.e., the rubbery polymer together with the resinous modifier, if used, is present in the impregnated sheet in the proportion of about 60% by weight of solid impregnant based on the weight of the fibrous component of the sheet. A larger amount of impregnant may also be used if desired, in order to increase the resilience of the sheet. The upper limit on the amount of impregnant is imposed only by the necessity for maintaining a high degree of porosity in the sheet and by the practical limitations of the impregnating step itself. Materials of suitable porosity have been made in which the impregnant was present in a proportion of about 140% of the weight of the dry fiber in the sheet. This proportion may be further increased, if desired, as long as the residual porosity of the sheet is maintained above the preferred level of 37%.

Any rubbery polymer either in solution or in water dispersion may be used as the impregnant, as for example, natural rubber or any of the well-known synthetic rubbers such as isoprene or butadiene polymers or co-polymers, neoprene, Thiokol or polyacrylates. The rubbery polymer must ordinarily be vulcanized or must be modified by the addition of a resinous material in order to increase its toughness, resilience and resistance to attack by solvents. The phenolic, urea, melamine, and epoxy resins have been found to be most satisfactory for modifying or reinforcing the rubbery polymer. The amount of the resin to be added depends on the nature of the impregnant and of the resin used, and on the degree of toughness desired in the impregnated material. The addition of too large a proportion of resin, however, will result in embrittlement of the sheet. In order to impart the necessary resilience to the impregnated fibrous sheet material, the rubber-resin combination must have essentially rubbery characteristics. The upper limit of resin which may be added without destroying the rubbery nature of the combination of impregnants appears to be about 30% based on the combined weight of rubber and resin. Other modifying or cross-linking agents may be added to the impregnants to increase their resilience if desired, or polymers having a high degree of toughness and resilience without further modification may be used.

Preferably, a thin continuous protective coating is utilized on the outermost surface of the compressible member. The purpose of this protective coating is merely to prevent any deterioration of the compressible member which might occur from abrasion or from solvents or inks which might come in contact with the roll. Therefore, in order to minimize any effects which the surface coating might have, an extremely thin layer is employed. Generally, less than about 30 mils are employed, more preferably 5 to 10 mils.

Any elastomeric material is suitable for use as a surface coating. However, due consideration should be given to the use which will be made of the roll in the selection of the surface coating in order to select one which possesses the necessary properties for such use. The surface layer is employed in the form of a film adhesively secured to the outermost layer of the compressible member. Alternatively, a coating may be applied from a solvent solution or from an aqueous dispersion As examples of suitable materials for such surface coatings, mention may be made of synthetic rubber compositions such as butadiene/acrylonitrile and butadiene/styrene/acrylonitrile copolymers, vinyl polymers such as polyvinyl chloride, epoxy resins, and polyurethanes. As stated above, the surface coating should be thin enough to prevent any movement of the layer which might diminish the effect of the compressible member.

The surface coating may also be applied by means of a shrinkable polymer in the form of a tube, which is fitted over the roll and then shrunk by the application of heat. Such shrinkable polymers are well known to the art.

The novel rolls of the present invention are prepared by applying to a nonresilient shaft or core at least one layer of compressible material which has been coated at least on one side with an adhesive, preferably a vulcanizing adhesive. In a preferred embodiment at least two layers of compressible material are employed. In order to provide a smooth and substantially round roll, the compressible member is ground to close tolerances. The top surface of the compressible member is then covered with a relatively thin coating of rubber or polymer in order to minimize wear and provide abrasion and solvent resistance to the compressive material. Since the surface coating is not intended to have any effect on the compressive properties of the roll and must not impart elastic distortion, the surface coating is preferably as thin as possible, consistent with its ability to provide abrasion or solvent resistance to the compressible material. After the surface coating has been applied, the roll is then once again ground to a substantially true round. Preferably, the roll is ground to the tolerance of ±0.001 inch within the roll. A plurality of layers skived at the ends of a single sheet of the compressible member may be employed in forming the roll or a series of butt-jointed sheets of compressible material may be utilized.

If the adhesive employed is a curing type, it may be desirable to employ cloth tape or other restraining means on the coated rolls prior to and during the cure unless the adhesive employed is sufficiently strong to prevent relaxation or slippage of the layers.

The adhesives utilized in bonding the various layers which make up the novel rolls of the present invention are conventional and well known to the art Preferably, adhesives such as solutions of neoprene and butadiene-acrylonitrile latices are employed. The adhesives may be reinforced with, for example, phenolic or epoxy resins.

The adhesives may also contain stabilizers as well as curing agents and accelerators.

By means of the novel roll of the present invention, it is possible to obtain an amount of impression width equal to that obtainable with a rubber roll without the distortion inherent in rubber rolls. By using a greater number of plies of a compressible member, more compression and consequently a greater impression width can be achieved with the same pressure.

In a particularly preferred embodiment the compressible member is not applied directly to the nonresilient core but is utilized over an intermediate highly flexible compressible elastic material. Cellular rubber or plastic material are employed as the intermediate layer. As discussed above, such materials would be entirely unsatisfactory if used as the sole roll material because they are not dimensionally stable and are subject to distortion. However, when utilized in a roll with a dimensionally stable but volume-compressible outer layer, rolls are obtained wherein relatively large contact areas are obtained without distortion at comparatively light pressures, e.g., up to 10 pounds per linear inch, more particularly, 0.25 to 4 pounds per linear inch. By means of the truly compressible and dimensionally stable outer material, the normally distortable inner layer is stabilized, that is, the compressible member prevents lateral movement or flow of the inner layer.

The layer of cellular material may be bonded to the core in a single sheet of butt-jointed or skived material, utilizing the above-mentioned adhesives or, more preferably, applied to an adhesive-coated core as rings or discs which have been cut out from a sheet of cellular material. The desired number of layers of material which constitutes the compressible member is then adhesively applied to the upper surface of the cellular material in the same manner as described above.

It is customary in the art to use a softer rubber when a relatively large contact area between rolls is desired at comparatively light pressures. However, with the increasing softness of the rubber, there is an attendant loss in the recovery of the rubber, as well as distortion. By means of the above-described preferred embodiment wherein the truly compressible dimensionally stable member is located over a relatively unstable, highly compressible and resilient material, rolls can be prepared to provide any contact area desired without the loss of resilience or the occurrence of distortion which is found in rubber rolls. The inner foam material collapses to the desired degree under pressure to provide the desired contact area at the low pressure while the outer, truly compressible member stabilizes the foam layer and prevents distortion while providing a uniform contact area. The above-described rolls have also been found to provide less than 1% nip velocity variation throughout a wide range of pressures.

Long rolls of relatively small diameter employ materials which provide a contact area at relatively low pressures. Long rolls are subject to deflection under relatively high pressures causing damage to bearings and uneven contact with the driving roll. Therefore, in order to prevent the possibility of such damage, relatively low pressures are generally employed with such long rolls. As described above, the novel rolls of the present invention are particularly suitable for use in long rolls because the desired impression widths can be obtained with very little pressure, thereby minimizing or entirely eliminating roll deflections. Long rolls of relatively small diameter are frequently employed as inking rolls.

Natural sponge rubber, cellular neoprene, and flexible polyurethane foams have been found particularly suitable for use as the inner layer in the novel rolls of this invention. Natural rubber is preferred because of its high rate of recovery. Cellular rubber and plastic materials possessing a wide variety of ranges of properties are readily available. The particular properties of the cellular material are selected in view of the particular employment of the roll in which it is to be used. Preferably, the cellular material has a compression (force in pounds required to compress 1 square inch 25% in thickness) of 2 to 20. In a particularly preferred embodiment sponge rubber having a compression of 5 to 9 is employed.

Figure 2:
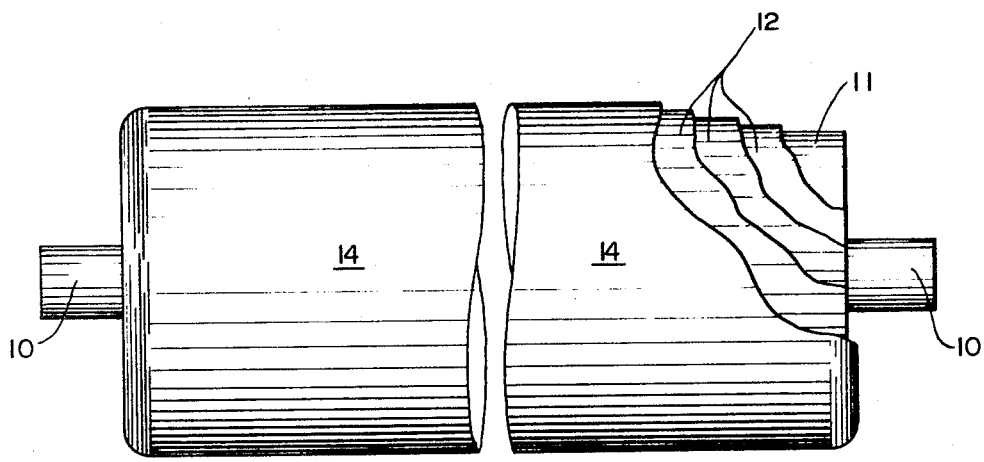

Referring now to the drawings, FIGURES 1 and 2 illustrate one embodiment of the novel roll of the present invention wherein the nonresilient core 11 is supported and rotated on shaft 10. A plurality of layers of compressible material 12 are secured to core 11 and to successive layers of compressible material by means of adhesive layers 13. A thin protective rubbery coating 14 covers the surface of the compressible material.

Figure 3:
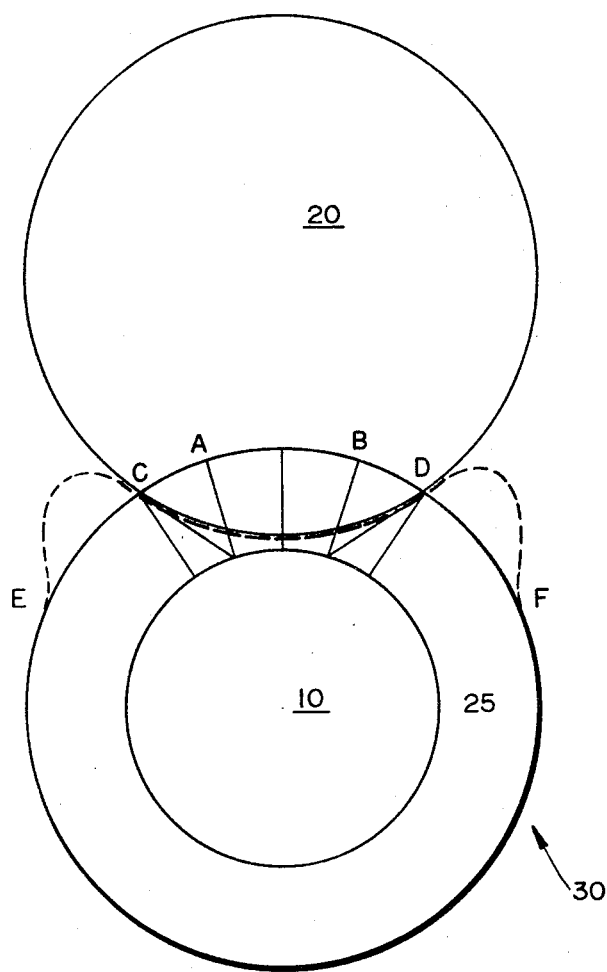

FIGURE 3 is a diagrammatic view, exaggerated for clarity, illustrating the function of the novel roll of the present invention as contrasted with a rubber roll. As steel roll 20 contacts roll 30, the material 25 covering nonresilient core 10 is depressed by the force of steel core 20 and forms arc CD. In the case wherein material 25 is rubber, since rubber is not truly compressible but rather distortable, it must flow out of the area CABDC. The rubber displaced by the force of the steel roll is represented by the arcs formed by dotted lines CE and DF. With these bulges on either side of the nip and the obvious change in shape and circumference of the rubber roll, the aforementioned disadvantages of rubber are apparent. As stated above, the deficiencies found in rubber rolls are also present in plastic rolls. However, where the material 25 is a compressible member within the scope of the present invention, the arcs indicated by dotted lines CE and DF do not form since the material is volume-compressible. It will be further noted that there is no change in the circumference of the roll since arc CD is the same length as are CABD and there is no distortion in arc DFEC.

Figure 4:
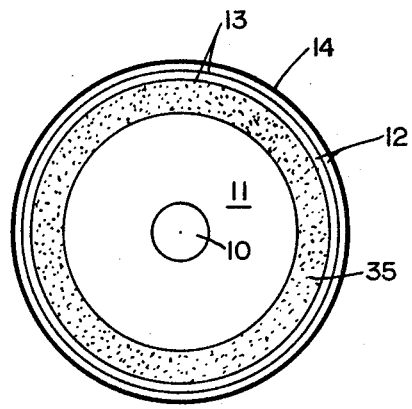

FIGURE 4 is a cross-sectional view of an especially preferred embodiment of the present invention. Nonresilient core 11 is supported and rotated on shaft 10. A layer of highly flexible sponge rubber 35 is located on core 11. A plurality of layers of compressible, dimensionally stable material 12 is adhered to sponge rubber 35 and to successive layers of compressible materials by means of adhesive layers 13. Thin protective rubbery coating 14 covers the surface of the compressible material.

The following nonlimiting examples illustrate the preparation of compressible material suitable for use in the printing rolls of this invention.

Example 1

Paper of cotton linters having an average ream weight of 115 pounds and a density of about 4 was impregnated with a mixture of 100 parts by weight (solids basis) of a medium acrylonitrile latex (Hycar 1572) and 10 parts by weight (solids basis) of a melamine reinforcing resin (Parez 613). The weight of the impregnane on the fibers (dry basis) was about 110%. The sheet was partially cured at 300° F. for about 4 minutes. The thus-formed compressible material had an average thickness of about 26 mils, an initial porosity of about 50%, and a residual porosity at 4 mils compression of about 41%.

Example 2

A paper comprising 50% by weight cotton linters and 50% by weight of ⅛ inch nylon fibers having a ream weight of 96.2 pounds and a density of 3.4 was impregnated with a mixture of 100 parts by weight (solids basis) of a medium acrylonitrile latex (Hycar 1572) and 20 parts by weight (solids basis) of a phenol formaldehyde resin (Durez 14798). The weight of impregnant on the fibers (dry basis) was about 133%. The sheet was cured for 4½ minutes at 315° F. and for 4 minutes at 380° F. The thus-formed compressible material had an average thickness of 22.5 mils, an initial porosity of about 50%, and a residual porosity at 4 mils of about 40%.

The following nonlimiting examples illustrate the preparation of printing rolls within the scope of the present invention.

Example 3

A steel cylinder 4.870 inches in diameter was coated with phenol formaldehyde resin (Durez 14798) in toluene as a prime coat. A sheet of compressible material prepared according to the porcedure of Example 1 was then coated on both sides with a propylene dichloride solution of neoprene rubber. The solution of neoprene rubber also contained magnesium oxide and zinc oxide curing agents. Two coats of the neoprene adhesive were applied to both sides of the compressible material and dried to produce a dry coating of 1 to 2 mils on the compressible material. One end of the compressible material was then skived at an angle. The exposed compressible material which resulted from the skiving was then recoated with the neoprene adhesive. The neoprene adhesive coatings were then activated with methylene chloride and the steel roll was wrapped with the compressible material under tension. Five thicknesses of compressible material were applied to the roll. The thus-formed roll was then wrapped with fabric tape to prevent relaxation or separation of the layers of the roll during curing. Curing was carried out at 250° F. for one-half hour and at 312° F. for one-half hour. The fabric tape was then removed. The roll had a Durometer of 75 Shore A. The coating of compressible material was then ground to a true round and sanded smooth. The compressible material after grinding and sanding was found to be 105 mils in thickness. The compressible material was then coated with polyurethane elastomer (Estane 5740×7) dissolved in tetrahydrofuran. The coating was dried and ground to a true round. The coating thickness was found to be 28 mils after grinding.

Example 4

A steel cylinder and compressible material were prepared by coating with adhesive as described in Example 3. A piece of the compressible material with the adhesive activated by methylene chloride was applied to the steel cylinder and butt-jointed. Three additional layers of compressible material were then applied to the roll in a continuous sheet as in Example 3. The adhesives were cured using the same conditions described in Example 3 and a 22½-mil coating of polyurethane elastomer was applied to the surface of the compressible material. Except for the above-stated differences, the same processing and finishing operations were carried out.

Example 5

An inking roll for offset was prepared by priming a steel cylinder 1.35 inches in diameter with a solution of phenol formaldehyde resin in toluene and drying the coating. Compressible material prepared according to the procedure of Example 1 was skived at an angle on one end and then coated on both sides with an adhesive solution comprising a butadiene-acrylonitrile copolymer latex (Hycar 1571) reinforced with a phenolic resin solution (Durez 14798). The adhesive coating was about 0.5 mil thick. The compressible material was then applied to the steel roll under tension to provide a thickness of 24 layers. The roll was then wrapped with cloth tape to prevent any relaxation of the layers during curing. The curing was carried out for ½ hour at 300° F., and the tape was then removed. After the roll had cooled, it was ground to a substantially true round on a grinding wheel. The diameter of the roll was now 2.075 inches. The roll was again coated with the adhesive solution and dried. A sheet of rubber about 35 mils in thickness and comprising butadiene/acrylonitrile rubber (Hycar 1053), factice, and a curing agent was wrapped around the surface of the roll. The roll was again wrapped with cloth tape and cured for 20 minutes at 312° F. The cloth tape was removed and the roll ground to a substantially true round on a grinding wheel. The diameter of the finished roll was 2.125 inches.

The roll of Example 3 was run on a gravure press as the impression roll. The test was carried out without a paper web. The pressure was varied in four steps from 42 to 72 to 102 to 132 pounds per linear inch. The roll speed was approximately 400 revolutions per minute, and the roll was run for a total of over 80,000 cycles. Measurements indicated a significant improvement in the velocity characteristics across the nip area. The velocity variation was found to be reduced to less than 1%, and generally about 0.5%, of the gravure roll, whereas prior art rolls under the same printing conditions show velocity variations of from 1 to 3% and higher. Velocity variations with the rolls of the present invention are constant over a wide range of pressures whereas prior art rolls show changes in nip velocity with changes in applied pressure. No change in web tension was found when paper was run indicating that the rolls of this invention obviate the inducement of stresses in the web during printing, thus obviating the possibility of web failure.

The rolls described in the above examples were found to function satisfactorily when used in printing operations. For example, a comparative test between a rubber roll and a roll of this invention, at a thousand feet of paper per minute, showed a clear sharp print in the case of the roll of this invention whereas the print on paper which passed over the rubber roll showed fuzzy edges indicative of static electricity. In addition, the distortion and nip velocity variation found in the rubber roll was not present in the case of the roll of this invention.

The nip velocity measurements reported herein were made by the following procedure. A steel cylinder, the same diameter as the roll under test, was mounted on a frame and attached to a driving mechanism to provide rotational speeds corresponding to web speeds of from 20 feet per minute to 1200 feet per minute. The roll under test (rubber or roll of the present invention) idles on ball bearing pressed onto a stationary eccentric shaft. Torque applied to the eccentric shaft by means of an arm and a spring scale controls tthe pressure of the test roll against the steel roll. The steel cylinder actually consists of two cylinders mounted on the same drive shaft and separated by a gap 0.085 inch in width. A stationary blade 0.062 inch thick extends through the gap to the inside of the rotating cylinders and supports a velocity wheel. The velocity wheel, 1.125 inches in diameter, idles on ball bearings and fits freely into the gap to contact the surface of the roll under test. The support blade has an adjustable mounting, thereby permitting the point of contact of the velocity wheel and the roll under test to be varied. The rim of the velocity wheel is straddled by the yoke of a tape recorder head into which a slot has been cut. Six evenly spaced holes are located in the wheel close to the outside diameter. When the wheel turns, the presence of a hole in the air gap of the yoke will change the inductance of the head. The head forms one arm of a resonant bridge tuned to 20 kc. As the wheel turns, the passage of a hole through the head will unbalance the bridge. The resulting amplitude modulated signal is detected, filtered, and fed to a limiter to reduce noise. The square wave output goes to an electronic pulse ratio counter. A glass-enclosed reed switch is periodically closed by a small permanent magnet turning at the same speed as the steel cylinder. This signal is filtered to eliminate the noise caused by contact bounce and fed to the base count terminal of a counter. The number displayed after 100 turns of the steel cylinder represents six times the number of turns of the velocity wheel per 100 turns of the steel cylinder. In the case of rubber or plastic rolls a correction must be made to compensate for the flow of material into the measuring gap. A reed switch actuated at each turn of the test roll serves to provide the following ratio from which the influence of the pressure on the turns ratio can be determined: test roll turns per steel cylinder turns.

In addition to the above-described electronic procedure, the nip velocity characteristics may also be determined stroboscopically.

The particular construction of the novel rolls of the present invention depends upon the degree of compression or the contact area required for the specific employment of the roll. For example, as the number of plies of compressible material increases, the greater the amount of compression and correspondingly larger land for a given force. In gravure printing the preferred number of plies of 25-mil thick compressible material of Example 1 is 4. If an inking roll is desired, a layer of foam rubber is preferably employed between the nonresilient core and 4 layers of the compressible material of Example 1. By varying the compressible materials along with the presence or absence of sponge materials of various compression, a wide variety of rolls may be prepared while still obtaining the advantageous effects described above.

Surprisingly, it has been found that increasing the number of plies of the compressible member to obtain a given amount of compression does not greatly change the hardness of the roll as measured by a Shore Durometer. This is contrary to what has been found with rubber rolls where a greater contact area is achieved by the use of a softer and therefore more distortable rubber roll.

The hardness of the rolls of this invention may be made by modifying the compressible member, e.g., by vulcanizing the impregnant or by the addition of a resinous material such as a phenolic resin. As long as the surface coating is maintained relatively thin, preferably 30 mils or less, it asserts substantially no effect on the hardness of the roll.

running paper through two identical size sets of nips, one employing the roll of Example 2 and the other a rubber roll. The paper was found to run substantially slower through the nip employing the rubber roll because of the increased circumference of the roll due to the distortion of the rubber.

Table 1 illustrates the particularly preferred embodiment of the present invention wherein a layer of sponge rubber is positioned between the nonresilient core and the compressible member. In the Examples 6 to 20, the compressible member was composed of material described in Example 1. In Example 21 the compressible member was composed of material described in Example 2. The sponge rubber employed was natural sponge rubber which was cut into discs and adhesively secured to the nonresilient core. The adhesive employed in all of the following examples was the adhesive disclosed in Example 5. Examples 17, 19, and 20 utilized the same surface coating as Example 5 while the remainder utilized the polyurethane coating described in Example 3. Table 1 also shows the land or contact area for each roll at 3.5 lbs. per linear inch. The land was determined in the following manner: A film of ink was applied to the roll, the roll was placed on a sheet of paper, and the shaft was then weighted to provide a force of 3.5 lbs./linear inch. The land was then determined from the area on the paper which recovered the ink from the roll.

From the following table it will be seen that the particular foam, the foam thickness, and the thickness of the compressible member may be varied over relatively wide ranges to produce rolls having any desired compressible properties. For comparative purposes a rubber roll having a layer of 35 Shore A rubber 0.780 inch in thickness was included as a control.

TABLE 1

| Example No.: | Core diameter (inches) | Foam thickness (inches) | Foam compression [1] | Compressible member thickness (inches) | Coating thickness (inches) | Finished roll diameter (inches) | Land at 3.5 lbs. per linear inch (32nds of an inch) |
|---|---|---|---|---|---|---|---|
| 6 | 1.375 | 0.337 | 5–9 | 0.050 | 0.005 | 2.160 | 11 |
| 7 | 1.375 | 0.225 | 2–5 | 0.050 | 0.005 | 1.965 | 11 |
| 8 | 1.375 | 0.337 | 2–5 | 0.075 | 0.005 | 2.120 | 10 |
| 9 | 1.375 | 0.225 | 5–9 | 0.050 | 0.005 | 1.935 | 10 |
| Control [2] | 0.815 | | | | | 2.735 | 10 |
| 10 | 0.375 | 0.337 | 5–9 | 0.075 | 0.005 | 2.120 | 9 |
| 11 | 1.375 | 0.275 | 5–9 | 0.075 | 0.005 | 1.985 | 9 |
| 12 | 1.375 | 0.225 | 5–9 | 0.075 | 0.005 | 1.985 | 9 |
| 13 | 1.375 | 0.225 | 5–9 | 0.100 | 0.005 | 2.035 | 8.5 |
| 14 | 1.375 | 0.175 | 5–9 | 0.075 | 0.005 | 1.835 | 8 |
| 15 | 1.375 | 0.337 | 5–9 | 0.100 | 0.005 | 2.260 | 7 |
| 16 | 1.375 | 0.337 | 9–13 | 0.075 | 0.005 | 2.210 | 7 |
| 17 | 1.375 | 0.225 | 2–5 | 0.075 | 0.020 | 2.125 | 6.75 |
| 18 | 1.375 | 0.150 | 2–5 | 0.125 | 0.015 | 1.965 | 6 |
| 19 | 1.375 | 0.225 | 5–9 | 0.130 | 0.020 | 2.125 | 5 |
| 20 | 1.000 | | | 0.550 | 0.020 | 2.125 | 4 |
| 21 | 1.375 | 0.312 | 5–9 | 0.045 | 0.005 | 2.115 | 12 |

[1] Force in pounds required to compress 1 square inch 25% in thickness.
[2] Rubber layer of 35 Shore A Durometer and 0.780 inch in thickness.

In comparing a standard rubber roll used in gravure printing with a roll of the present invention, it was found that ¾ inch thickness of rubber having a hardness of 80 Shore A Durometer was needed for a ½ inch contact area at 132 p.s.i. A roll within the scope of the present invention comprising 100 mils of compressible material of Example 1 with a 25-mil polyurethane elastomeric coating also had a hardness of 80 Shore A Durometer. However, the roll of the present invention provided not only the desired ½ inch contact area at 132 p.s.i., but also showed a decrease of more than 50% in velocity change through the nip as compared with the above-described rubber roll of the same hardness during comparative printing operations.

Figure 5:
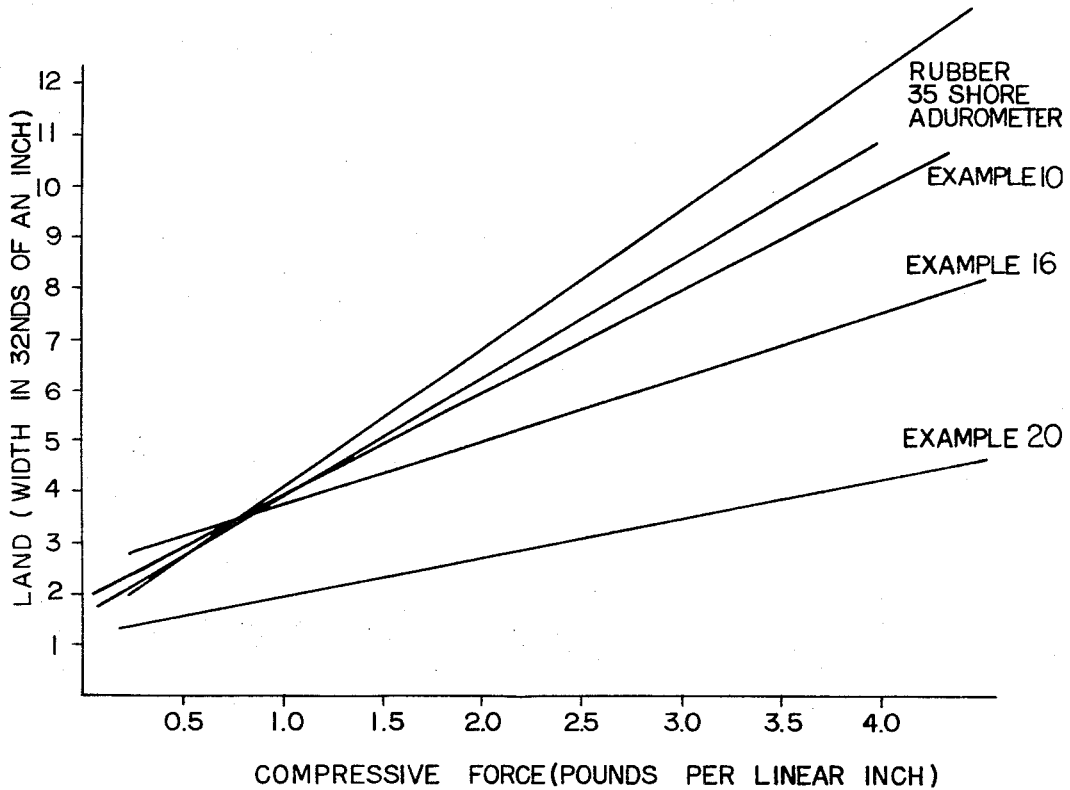

In other words, when the pressure on the rubber roll was increased, the speed of the paper through the nip decreased. This was found to be true not only by actual measurement of surface speed of the roll but by actually FIGURE 5 shows a plot of selected rolls from Table 1 and the relationship of varying amounts of compressive force required to produce a given land. Whereas Table 1 illustrates only the land obtained at a force of 3.5 lbs. per linear inch, the graph in FIGURE 5 shows that a particular roll may be employed over a wide range of pressure to obtain a given land. The novel rolls also exhibit the aforementioned advantages throughout a wide range of compressive forces.

One method of evaluating distortion in compressible materials when utilized on rolls is by the measurement of the variation of nip velocity when the roll is driven by contact with a nonresilient, e.g., steel roll, of the same diameter. When rubber is employed, variations in nip speed are generally found to be in excess of 1% and more often up to 3% or greater. In addition, with changing pressure on the rubber rolls, velocity changes also are noted. In contrast to the rubber rolls, nip velocity variations of as little as 0.5 to 0.75% are found with the novel rolls of the present invention, and no velocity variation is noted with changing pressures. For example, the roll of Example 3 was driven by a steel roll at pressures of 42, 72, 102, and 132 feet per inch with no measurable velocity variation noted.

The novel rolls of the present invention provide an impression width of ⅛ inch to 1 inch at pressures ranging from 0.25 to 200 pounds per linear inch. In applications as inking rolls, for example, 2 to 4 pounds per linear inch are employed and in gravure printing higher pressures, e.g., 100 to 175 pounds are employed.

In some applications such as the printing of highly insulated materials, for example, waxed, plastic-impregnated, or polyethylene-coated sheets, usually high charges of static electricity are generated when rubber rolls are employed. Great difficulty has been found in removing the charges. As well as introducing difficulties in the printing operation itself, the charge may result in fires, e.g., the ignition of the ink bath. Contact rollers and brushes have been utilized to remove the charges with little success. A recent method of solving the problem of static electricity is the use of radio isotopes to ionize the air and to allow static charges to leak away to the earth. The use of radio isotopes, however, entails additional cost and modification of the equipment and operations where it is utilized. In operations where the novel rolls of the present invention are employed, there is no development of static electricity, thereby negating the requirement for the above-described procedures for eliminating static electricity.

Although the novel rolls of the present invention have been described primarily in terms in printing operations, it should be understood that the rolls are employed wherever a compressible roll is desired.

What is claimed is:

1. A roll which comprises, in sequence, a nonresilient core, sponge rubber having a compression of 2 to 20 as defined as the force in pounds required to compress 1 square inch 25% in thickness, and at least one layer of a resilient volume-compressible impregnated fibrous sheet material, said material having a firmness such that a pressure of at least 10 pounds per square inch must be exerted on the sheet to effect an initial compression of 2 mils and a residual porosity at 4 mils compression of at least 37%.

2. The roll as defined in claim 1 wherein said roll has impression width of at least ⅛ inch at .25 to 4 pounds per linear inch.

3. The roll as defined in claim 1 wherein the distortion of said roll is less than 1% as measured by nip velocity variation when driven by a nonresilient roll of the same diameter.

4. The roll as defined in claim 1 wherein said roll possesses the ability to recover to within 2% of the original thickness substantially immediately upon the release of the applied force.

5. The roll as defined in claim 1 wherein said sponge rubber has a compression of 2 to 5.

6. The roll as defined in claim 1 wherein said sponge rubber has a compression of 5 to 9.

7. The roll as defined in claim 1 wherein said sponge rubber has a compression of 9 to 13.

8. The roll as defined in claim 1 wherein the layers of compressible material number at least 2.

9. The roll as defined in claim 1 wherein the layers of compressible material number at least 4.

10. The roll of claim 1 wherein the layers of compressible material number at least 4.

11. The roll of claim 1 wherein said compressible material has a thin continuous protective coating.

12. The novel roll of claim 11 wherein said protective coating is a polyurethane elastomer.

13. The novel roll of claim 11 wherein said protective coating is a cured butadiene-acrylonitrile rubber.

14. The combination which comprises at least two rotatable rolls in pressure contact, said rolls comprising, in sequence, a nonresilient core, sponge rubber having a compression of 2 to 20 as defined as the force in pounds required to compress 1 square inch 25% in thickness, and at least one layer of a volume-compressible, resilient, impregnated fibrous sheet material, said material having a firmness such that a pressure of at least 10 pounds per square inch must be exerted on the sheet to effect an initial compression of 2 mils and a residual porosity at 4 mils compression of at least 37%.

15. The combination which comprises a rotatable nonresilient roll in pressure contact with a rotatable roll comprising, in sequence, a nonresilient core, sponge rubber having a compression of 2 to 20 as defined as the force in pounds required to compress 1 square inch 25% in thickness, and at least one layer of a volume-compressible, resilient, impregnated fibrous sheet material, said material having a firmness such that a pressure of at least 10 pounds per square inch must be exerted on the sheet to effect an initial compression of 2 mils and a residual porosity at 4 mils compression of at least 37%.

16. The combination as defined in claim 15 wherein the variation in velocity through the nip when said nonresilient roll is the driven roll is less than 1%.

17. A novel compressible resilient printing roll comprising, in sequence, a nonresilient core, sponge rubber having a compression of 2 to 20 as defined as the force in pounds required to compress 1 square inch 25% in thickness, and a plurality of layers of compressible material adhesively secured to said core and a thin continuous protective coating covering the outermost layer of said compressible material, said compressible material being a compressible impregnated fibrous sheet material having a firmness such that a pressure of at least 10 pounds per square inch must be exerted on the sheet to effect an initial compression of 2 mils and a residual porosity at 4 mils compression of at least about 37%.

References Cited

UNITED STATES PATENTS

| | | | |
|---|---|---|---|
| 1,555,389 | 9/1925 | Stevens | 101—217 XR |
| 1,897,864 | 2/1933 | Schacht. | |
| 2,263,285 | 11/1941 | Bolog | 101—375 XR |
| 3,053,718 | 9/1962 | Hechtman et al. | 101—407 |
| 3,147,698 | 9/1964 | Ross | 101—407 XR |
| 3,245,345 | 4/1966 | Graham | 101—407 |

ROBERT E. PULFREY, Primary Examiner

U.S. Cl. X.R.

29—132; 101—348, 407